(12) United States Patent
Royal et al.

(10) Patent No.: US 6,430,938 B1
(45) Date of Patent: Aug. 13, 2002

(54) CRYOGENIC VESSEL SYSTEM WITH PULSE TUBE REFRIGERATION

(75) Inventors: John Henri Royal, Grand Island; Christian Friedrich Gottzmann, Clarence; Arun Acharya, East Amherst, all of NY (US); Gary D. Lang, Naperville, IL (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/978,765

(22) Filed: Oct. 18, 2001

(51) Int. Cl.[7] .................................................. F25B 9/00
(52) U.S. Cl. ............................... 62/6; 62/47.1; 62/51.1
(58) Field of Search ........................... 62/6, 45.1, 47.1, 62/51.1

(56) References Cited

U.S. PATENT DOCUMENTS

| 3,133,422 | A | | 5/1964 | Paivanas et al. ............. 62/50 |
|---|---|---|---|---|
| 4,129,014 | A | * | 12/1978 | Chubb ......................... 62/333 |
| 4,718,239 | A | | 1/1988 | Nowobilski et al. ........... 62/55 |
| 4,727,723 | A | | 3/1988 | Durr ............................. 62/54 |
| 5,571,231 | A | | 11/1996 | Lee ............................. 62/48.2 |
| 5,699,839 | A | | 12/1997 | Dehne ......................... 141/248 |
| 5,794,450 | A | * | 8/1998 | Alexander ....................... 62/6 |
| 5,966,944 | A | | 10/1999 | Inoue et al. ................. 62/51.1 |
| 6,205,812 | B1 | | 3/2001 | Acharya et al. .............. 62/607 |
| 6,269,658 | B1 | | 8/2001 | Royal et al. .................. 62/643 |

* cited by examiner

*Primary Examiner*—William C. Doerrler
*Assistant Examiner*—Malik N. Drake
(74) *Attorney, Agent, or Firm*—Stanley Ktorides

(57) ABSTRACT

A cryogenic vessel system for containing cryogenic fluid wherein heat leak into the vessel interior is counteracted by refrigeration generated from energy provided by a pulse generator.

13 Claims, 3 Drawing Sheets

CRYOGENIC VESSEL SYSTEM WITH PULSE TUBE REFRIGERATION

TECHNICAL FIELD

This invention relates generally to the containment of cryogenic fluids such as for storage or other purposes.

BACKGROUND ART

The storage or other containment of a cryogenic fluid involves the use of insulated vessels to reduce as much as possible the loss of some of the cryogenic fluid due to heat leak into the vessel. However, even with the use of the best insulation systems available, a significant portion of the contained cryogen will vaporize due to the heat leak, resulting in a pressure increase within the container to the point at which the vapor is vented to the atmosphere through safety valves. This loss of cryogenic fluid imposes a significant economic burden, especially for higher cost cryogenic fluids such as helium and neon which are used for such applications as superconductivity.

Accordingly it is an object of this invention to provide a system for storing or otherwise containing a cryogenic fluid which can reduce or eliminate losses due to heat leak into the fluid.

SUMMARY OF THE INVENTION

The above and other objects, which will become apparent to those skilled in the art upon a reading of this disclosure, are attained by the present invention, one aspect of which is:

Method for providing refrigeration to a cryogenic vessel comprising:
  (A) providing a pulse to a working gas to produce a compressed working gas, and cooling the compressed working gas to produce cooled working gas;
  (B) expanding the cooled working gas in a cold end of a pulse tube to generate refrigeration to produce further cooled working gas; and
  (C) providing refrigeration from the further cooled working gas to a cryogenic vessel which contains cryogenic fluid.

Another aspect of the invention is:

A cryogenic vessel system comprising:
  (A) a vessel having an outer shell defining a vessel interior;
  (B) a pulse generator, a regenerator, a cold heat exchanger, means for passing a pressure wave through working gas from the pulse generator to the regenerator, and means for passing a pressure wave through working gas from the regenerator to the cold heat exchanger; and
  (C) a pulse tube having a cold end, said cold end being in flow communication with the cold heat exchanger, and said cold heat exchanger being at least in part within the vessel interior.

As used herein the term "cryogenic fluid" means a fluid which at atmospheric pressure is a gas at a temperature of 240 K.

As used herein the term "regenerator" means a thermal device in the form of porous distributed mass, such as spheres, stacked screens, perforated metal sheets and the like, with good thermal capacity to cool incoming warm gas and warm returning cold gas via direct heat transfer with the porous distributed mass.

As used herein the term "pulse tube" means a refrigerator device to produce low temperature refrigeration using suitable components including a pulse generator.

As used herein the term "orifice" means a gas flow restricting device placed between the warm end of the pulse tube expander and a reservoir in a pulse tube refrigerator.

As used herein the term "pressure wave" means a mass of gas that goes through sequentially high and low pressure levels in a cyclic manner.

DETAILED DESCRIPTION

The invention relates to vessels for containing cryogenic fluids such as stationary storage tanks, mobile tankage, dewars and the like. Among the cryogenic fluids which can be effectively contained with the use of this invention one can name hydrogen, helium, neon, oxygen, nitrogen, argon, carbon dioxide and mixtures such as air and natural gas.

Figure 1:
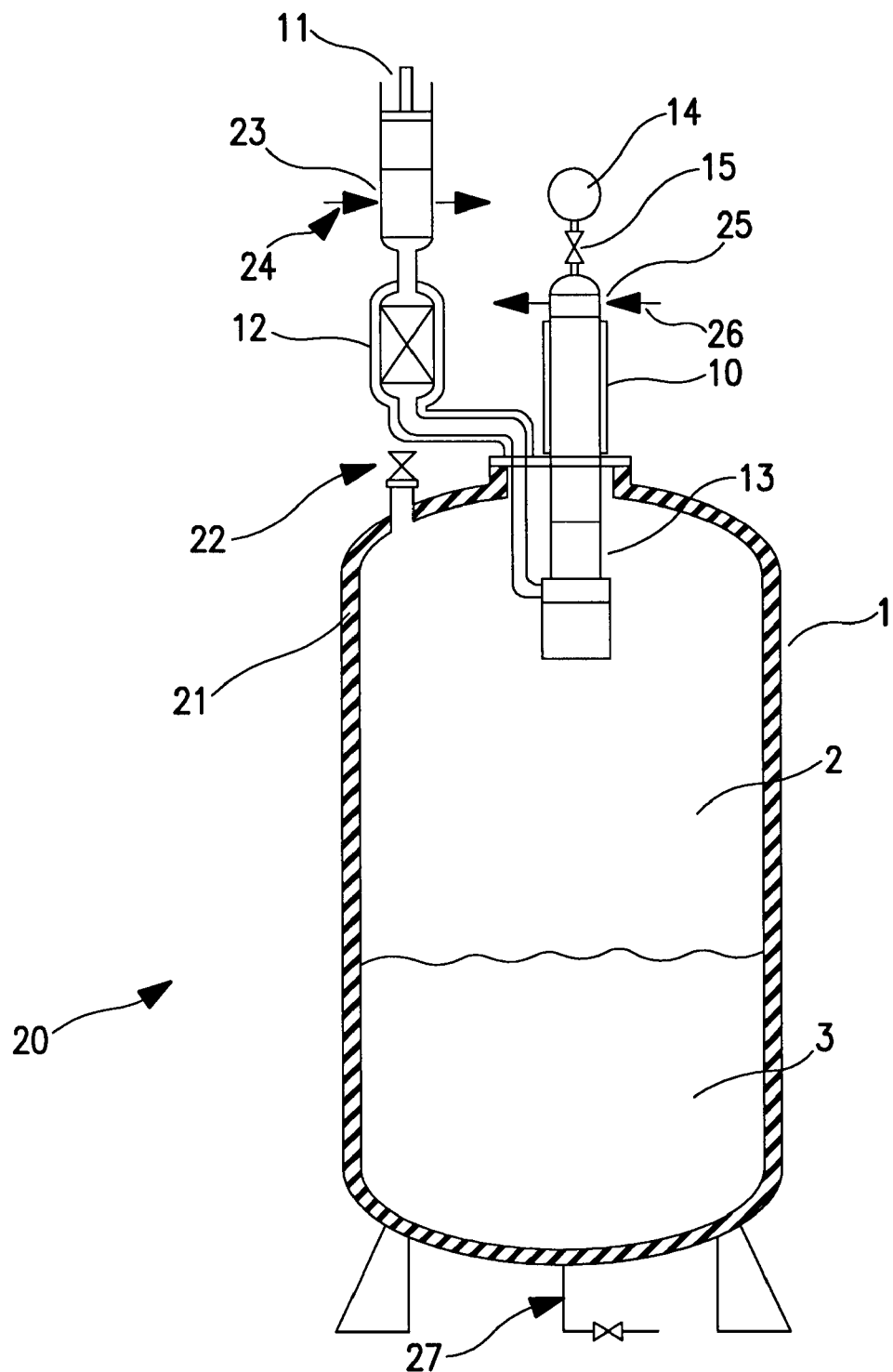
FIG. 1 is a cross-sectional representation of one preferred embodiment of the cryogenic vessel system of this invention.

The invention will be discussed in greater detail with reference to the Drawings. Referring now to FIG. 1, cryogenic vessel 20 has an outer shell 1, which defines a vessel interior 2. The vessel interior 2 contains insulation 21 which, in the embodiment of the invention illustrated in FIG. 1, is a layer of insulation abutting the inner surface of vessel shell 1. Vessel interior 2 also contains a quantity of cryogenic liquid 3. Absent the pulse tube refrigeration provision of this invention, ambient heat leak into the vessel through the insulation will cause some of the cryogenic liquid to vaporize and ultimately some of the vaporized cryogenic fluid will be vented through safety valve 22.

The pulse tube refrigeration system is typically a closed refrigeration system that pulses a working gas or refrigerant in a closed cycle and in so doing transfers a heat load from a cold section to a hot section. The frequency and phasing of the pulses is determined by the configuration of the system. One embodiment of a pulse tube refrigeration system is illustrated in FIG. 1.

In the pulse tube refrigeration system illustrated in FIG. 1, driver 11 may be a piston or some other mechanical compression device, or an acoustic or thermoacoustic wave generation device, or any other suitable device for providing a pulse or compression wave to a working gas. That is, the pulse generator provides a compression phase and an expansion phase to the working gas. When the cryogenic vessel is a mobile tank such as a cryogenic tank on a tractor-trailer, the driver or pulse generator may be advantageously driven by the engine which powers the mobile system or may be driven by heat generated by the engine via a thermoacoustic wave generation device. Driver or pulse generator 11 provides a pulse to a working gas to produce a compressed working gas. Helium is the preferred working gas; however any effective working gas may be used in the practice of this invention and among such one can name air, nitrogen, oxygen, argon and neon.

The compressed working gas is cooled in after cooler 23 wherein the heat of compression is removed by indirect heat exchange with cooling medium, such as water 24, and the resulting compressed working gas is then processed in regenerator 12. Within regenerator 12 the compressed working gas is cooled by heat exchange with regenerator media and then cooled compressed working gas is provided to cold heat exchanger 13 and then to the cold end of insulated pulse tube 10.

The geometry and pulsing configuration of the pulse tube refrigeration system is such that before the compression pulse from the driver passing through the working gas reaches the cold end of the pulse tube, the driver initiates the expansion phase. This causes the cooled compressed working gas at the cold end of the pulse tube to expand. The cold end of the pulse tube is the end adjacent the cold heat exchanger. This expansion causes the working gas within the pulse tube to be compressed in the direction of the warm end of the pulse tube and heat is removed from the warm end typically by use of a hot heat exchanger 25 by indirect heat exchange with cooling medium, such as water 26. Preferably the pulse tube refrigeration system employs an orifice 15 and reservoir 14 to maintain the gas displacement and pressure pulses in appropriate phases.

The warmer compressed pulse tube gas within the warm end of pulse tube 10 is processed in hot heat exchanger 25 and then into reservoir 14 through orifice 15. The gas motion, in appropriate phase with the pressure, is facilitated by incorporating orifice or valve 15 and a reservoir volume 14 where the gas is stored at an average pressure with small fluctuation. The size of reservoir 14 is sufficiently large so that essentially very little pressure oscillation occurs in it during the oscillating flow in the pulse tube. The inlet flow from the wave-generation device/piston 11 stops and the tube pressure decreases to a lower pressure. Gas from reservoir 14 at an average pressure passes through the orifice to the pulse tube, which is at the lower pressure. The further cooled expanded gas at the cold end of pulse tube 10 provides the refrigeration to the external load as it passes through the cold heat exchanger 13. Refrigeration from the further cooled working gas is thus passed by indirect heat exchange to the interior 2 of vessel 20 thereby serving to counter heat leak into the vessel and reduce or completely eliminate cryogenic fluid loss from the vessel due to such heat leak. The resulting warmer working gas is further warmed by processing in regenerator 12 as it cools the regenerator. Then it is ready to receive the next pulse. Cryogenic fluid may be withdrawn from vessel 20 such as through piping 27.

The orifice pulse tube refrigerator functions to provide refrigeration as the working fluid goes through cyclic compression and expansion in the pulse tube. The cycle is as follows: the pulse generator through timed compression and expansion phases causes the working gas at its warm end to be compressed and thereby heated. Since the compressed gas is at a higher pressure than the average pressure in the reservoir, it flows through the orifice into the reservoir and exchanges heat through the hot heat exchanger located at the hot end of the pulse tube. The flow stops when the pressure in the pulse tube is reduced to the average pressure. The pulse generator moves back and thus expands the gas at its warm end. The cold, low-pressure gas in the warm end of the pulse tube is forced toward the cold end of the pulse tube by the gas flow from the reservoir into the pulse tube through the orifice. This in turn pushes the further cooled gas at the cold end of the pulse tube to be processed through the heat exchanger at the cold end of the pulse tube. In this process it removes the heat from the fluid or other entity being cooled. This flow stops when the pressure in the pulse tube increases to the average pressure. The cycle is then repeated.

In FIG. 1 the cold heat exchanger is shown as being within the vessel interior 2 in the volume occupied by vapor. The cold heat exchanger could also be positioned so that it delivers at least some refrigeration directly to liquid within the vessel interior. In another embodiment the cold heat exchanger could be connected to a heat pipe or other heat transfer device which passes the refrigeration to the cryogenic vapor and/or cryogenic liquid within the vessel interior. In yet another embodiment, the cold heat exchanger could be positioned to deliver refrigeration directly to the insulation within the vessel interior.

Figure 2:
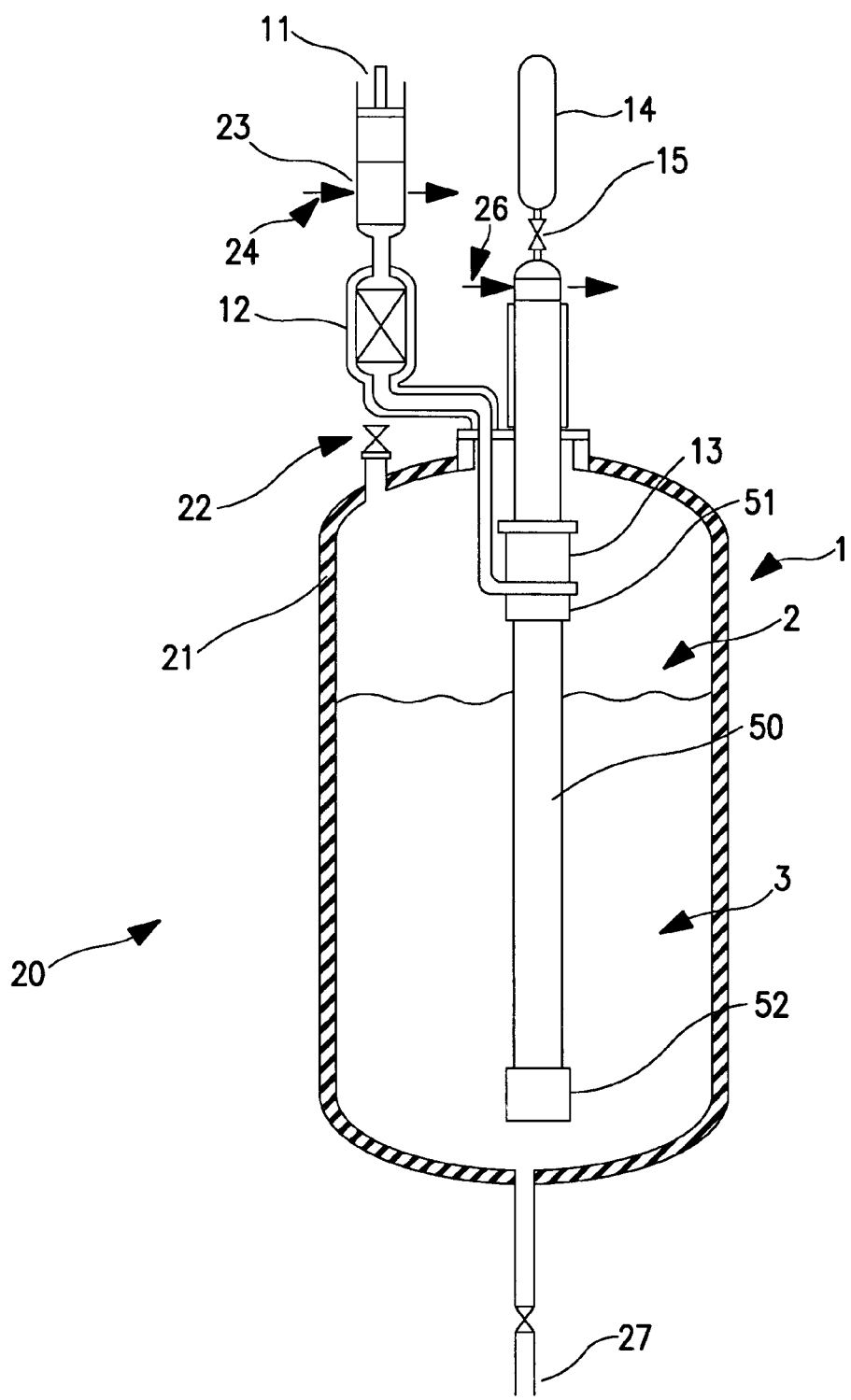
FIG. 2 is a cross-sectional representation of another preferred embodiment of the cryogenic vessel system of this invention wherein a heat pipe is employed.

FIG. 2 illustrates another embodiment of the invention wherein a heat pipe is used to deliver refrigeration from the cold heat exchanger to cryogenic liquid within the vessel interior. The numerals in FIG. 2 are the same as those of FIG. 1 for the common elements, and these common elements will not be described again in detail.

A heat pipe is a thermal device for efficiently transferring heat from one end of the pipe to its other end. Typically the device comprises a low conducting pipe, such as stainless steel pipe 50, closed at both ends and containing a heat transfer fluid. This heat pipe is charged with heat transfer fluid, i.e. gas or gas mixture, at appropriate pressure and temperature so as to change phase by condensing at the end 51 in contact with the cold heat exchanger of the pulse tube and by boiling at the other end 52 in indirect contact with the cryogenic fluid to be condensed or subcooled. For example, to condense vapor or subcool liquid in vessel interior 2 at, for example 80 K, the required mass of nitrogen gas within the heat pipe could be determined by the vapor and liquid portions designed for the heat pipe volume corresponding to the phase change condition of nitrogen at 80 K.

Figure 3:
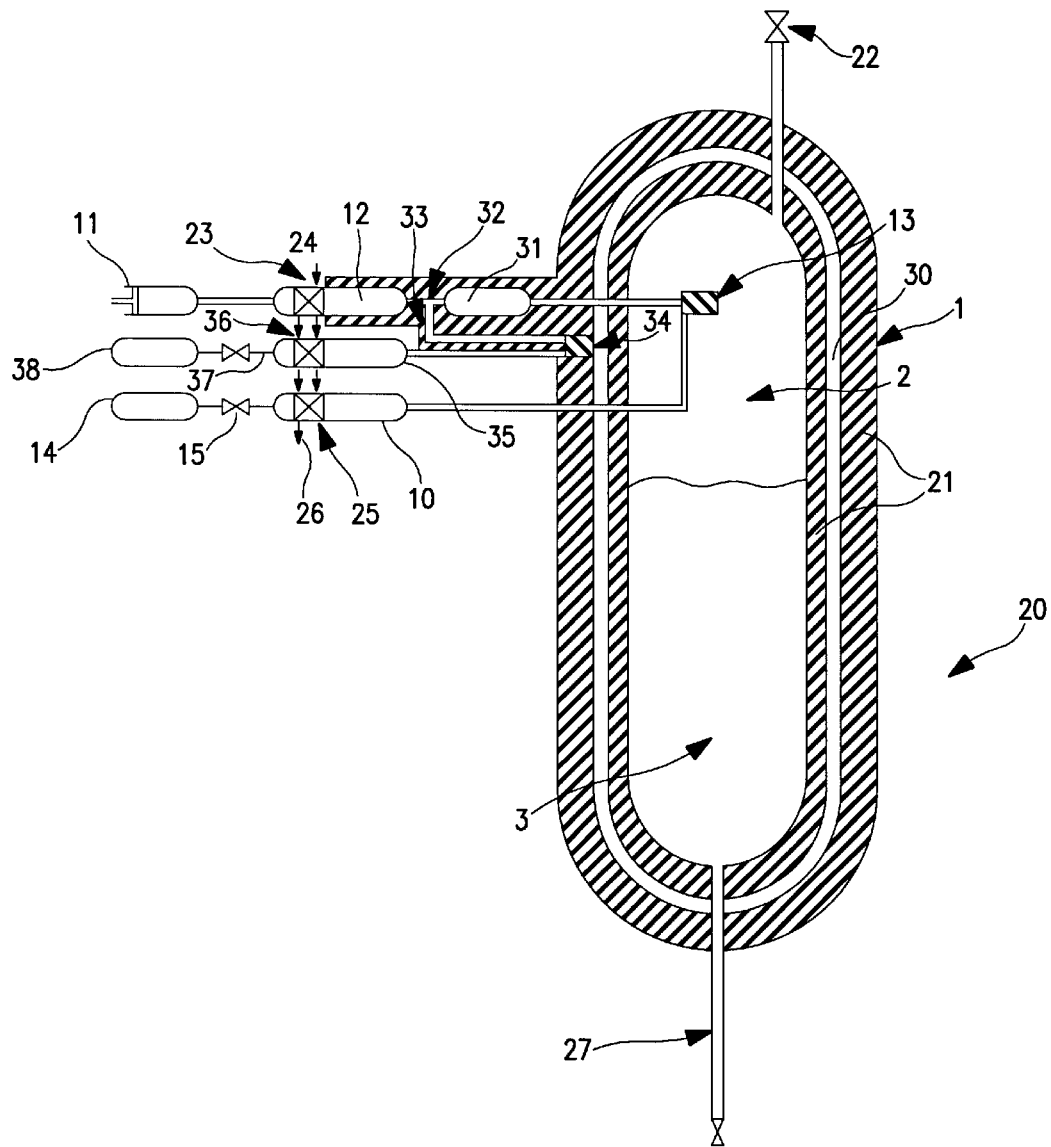
FIG. 3 is a cross-sectional representation of another preferred embodiment of the cryogenic vessel system of this invention wherein refrigeration is provided directly to the insulation within the vessel interior.

FIG. 3 illustrates another embodiment of the invention wherein refrigeration is provided to two places within the vessel interior, one of those places being a thermoshield within the insulation. The numerals in FIG. 3 are the same as those of FIG. 1 for the common elements, and these common elements will not be described again in detail.

Referring now to FIG. 3 cryogenic vessel 20 has a thermoshield 30 within insulation 21 in the vessel interior. The thermoshield could be any entity which serves to intercept heat leak into the vessel. For example, it could be metallic material, or it could be a refrigerant, e.g. liquid nitrogen. In the two stage pulse tube refrigeration system illustrated in FIG. 3, cooled compressed working gas from regenerator 12 is divided into two portions. A first portion 32 is processed in second regenerator 31 wherein it is brought to a lower temperature before being processed in cold heat exchanger 13. The remainder of this stage of the pulse tube refrigeration system operates in a manner similar to that described above with reference to FIG. 1.

A second portion 33 of the cooled working gas from regenerator 12 is processed in a second cold heat exchanger 34 which is in heat exchange relation with thermoshield 30. The second stage of the pulse tube refrigeration system illustrated in FIG. 3 which includes second pulse tube 35, second hot heat exchanger 36, second orifice 37, and second reservoir 38, operates in a similar manner to the first pulse tube stage except that the refrigeration generated by this second stage is delivered to the thermoshield within interior 2 rather than to the cryogenic fluid within interior 2. The two stages could employ two independent pulse tubes with thermal linkage or any other suitable effective configuration. For purposes of clarity the insulation covering a portion of the cold part of the two stage pulse tube refrigeration system is not illustrated in FIG. 3. Those skilled in the art will recognize that in normal operation such part will be insulated.

Although the invention has been described in detail with reference to certain preferred embodiments, those skilled in the art will recognize that there are other embodiments of the invention within the spirit and the scope of the claims.

What is claimed is:

1. Method for providing refrigeration to a cryogenic vessel which contains insulation with a thermoshield and also contains cryogenic fluid comprising:

(A) providing a pulse to a working gas to produce a compressed working gas, and cooling the compressed working gas to produce cooled working gas;

(B) expanding the cooled working gas in a cold end of a pulse tube to generate refrigeration to produce further cooled working gas; and (C) providing refrigeration from the further cooled working gas directly to the insulation.

2. The method of claim 1 wherein refrigeration is also provided directly to the cryogenic fluid.

3. A cryogenic vessel system comprising:

(A) a vessel having an outer shell defining a vessel interior;

(B) a pulse generator, a regenerator, a cold heat exchanger, means for passing a pressure wave through working gas from the pulse generator to the regenerator, and means for passing a pressure wave through working gas from the regenerator to the cold heat exchanger; and (C) a pulse tube having a cold end, said cold end being in flow communication with the cold heat exchanger, and said cold heat exchanger being at least in part within the vessel interior.

4. The cryogenic vessel of claim 3 wherein the vessel interior contains insulation with a thermoshield and the cold heat exchanger is in heat exchange relation with the thermoshield.

5. The cryogenic vessel of claim 3 wherein the vessel interior contains insulation with a thermoshield and further comprising means for passing a pressure wave through working gas from the regenerator to a second cold heat exchanger which is in heat exchange relation with the thermoshield.

6. The cryogenic vessel of claim 3 further comprising a second regenerator wherein the means for passing a pressure wave through working gas from the regenerator to the cold heat exchanger includes the second regenerator.

7. The cryogenic vessel of claim 3 wherein the pulse generator is a thermoacoustic device.

8. The cryogenic vessel of claim 3 wherein the pulse generator comprises a piston.

9. The cryogenic vessel of claim 3 further comprising a reservoir in flow communication with the pulse tube through an orifice.

10. The cryogenic vessel of claim 3 further comprising a heat pipe in heat exchange relation with the cold heat exchanger.

11. Method for providing refrigeration to a cryogenic vessel having an outer shell defining a vessel interior and which contains cryogenic fluid comprising:

(A) providing a pulse to a working gas to produce a compressed working gas, and cooling the compressed working gas to produce cooled working gas;

(B) expanding the cooled working gas in a cold end of a pulse tube to generate refrigeration to produce further cooled working gas; and (C) providing refrigeration to the cryogenic vessel by passing refrigeration from the further cooled working gas to a cold heat exchanger which is at least in part within the vessel interior.

12. The method of claim 11 wherein refrigeration is provided directly to the cryogenic fluid.

13. The method of claim 11 wherein refrigeration is provided to a heat pipe fluid which then provides refrigeration to the cryogenic fluid.

* * * * *